United States Patent
Tanaka et al.

(10) Patent No.: US 9,659,416 B2
(45) Date of Patent: May 23, 2017

(54) ABNORMALITY DETERMINATION APPARATUS FOR VEHICLE

(71) Applicant: DENSO CORPORATION, Kariya, Aichi-pref. (JP)

(72) Inventors: Yasuhiro Tanaka, Kariya (JP); Atusi Sakaida, Kariya (JP); Toshihisa Taniguchi, Kariya (JP); Norio Gouko, Kariya (JP); Yoshitaro Yazaki, Kariya (JP); Yoshihiko Shiraishi, Kariya (JP); Toshikazu Harada, Kariya (JP); Motoki Shimizu, Kariya (JP); Keita Saitou, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/895,860

(22) PCT Filed: May 1, 2014

(86) PCT No.: PCT/JP2014/062094
§ 371 (c)(1),
(2) Date: Dec. 3, 2015

(87) PCT Pub. No.: WO2014/196294
PCT Pub. Date: Dec. 11, 2014

(65) Prior Publication Data
US 2016/0125671 A1 May 5, 2016

(30) Foreign Application Priority Data

Jun. 4, 2013 (JP) .................................. 2013-117751
Oct. 30, 2013 (JP) .................................. 2013-225557

(51) Int. Cl.
*G01M 17/00* (2006.01)
*G06F 7/00* (2006.01)
(Continued)

(52) U.S. Cl.
CPC .............. *G07C 5/08* (2013.01); *B60R 16/023* (2013.01); *G01K 1/08* (2013.01); *G01K 17/08* (2013.01)

(58) Field of Classification Search
CPC ......... B60R 16/023; G01K 1/08; G01K 17/08
(Continued)

(56) References Cited

U.S. PATENT DOCUMENTS

2009/0200993 A1   8/2009  Maeda

FOREIGN PATENT DOCUMENTS

JP      S61013121 A    1/1986
JP      S62096831 A    5/1987
(Continued)

OTHER PUBLICATIONS

Office Action dated Dec. 22, 2015 in corresponding Japanese Application No. 2013-225557 with English translation.
(Continued)

*Primary Examiner* — Maceeh Anwari
(74) *Attorney, Agent, or Firm* — Harness, Dickey & Pierce, P.L.C.

(57) ABSTRACT

There is provided a heat flux sensor with first and second interlayer connection members composed of different metals from each other of which metal atoms maintain a predetermined crystal structure embedded in first and second via holes of a thermoplastic resin made insulating substrate, the first and the second interlayer connection members are connected in series alternately, and a control unit that performs abnormality determination of a heating element disposed in a vehicle. The heat flux sensor is provided to the heating element and outputs a sensor signal corresponding to heat flux between the heating element and an outside air, and the control unit determines based on the sensor signal that there is abnormality in the heating element when the heat (Continued)

flux between the heating element and the outside air is out of a predetermined range.

3 Claims, 9 Drawing Sheets

(51) Int. Cl.
*G06F 19/00* (2011.01)
*G07C 5/08* (2006.01)
*B60R 16/023* (2006.01)
*G01K 1/08* (2006.01)
*G01K 17/08* (2006.01)

(58) Field of Classification Search
USPC ........................................................ 701/33.9
See application file for complete search history.

(56) References Cited

FOREIGN PATENT DOCUMENTS

| | | |
|---|---|---|
| JP | H03127446 U | 12/1991 |
| JP | 2002328849 A | 11/2002 |
| JP | 2006275540 A | 10/2006 |
| JP | 2008180491 A | 8/2008 |
| JP | 2009184639 A | 8/2009 |
| JP | 2012255717 A | 12/2012 |

OTHER PUBLICATIONS

International Search Report (in Japanese with English Translation) for PCT/JP2014/062094, mailed Aug. 5, 2014; ISA/JP.
Written Opinion for PCT/JP2014/062094, mailed Aug. 5, 2014; ISA/JP.

ABNORMALITY DETERMINATION APPARATUS FOR VEHICLE

CROSS REFERENCE TO RELATED APPLICATIONS

This application is a U.S. National Phase Application under 35 U.S.C. 371 of International Application No. PCT/JP2014/062094 filed on May 1, 2014 and published in Japanese as WO 2014/196294 A1 on Dec. 11, 2014. This application is based on and claims the benefit of priority from Japanese Application No. 2013-117751 filed on Jun. 4, 2013 and Japanese Application No. 2013-225557 filed on Oct. 30, 2013. The entire disclosures of all of the above applications are incorporated herein by reference.

TECHNICAL FIELD

The present invention relates to an abnormality determination apparatus for a vehicle that determines an abnormality of a heating element mounted on the vehicle.

Background Art

Conventionally, an abnormality determination apparatus for a vehicle that detects the temperature of a heating element mounted on the vehicle by a temperature sensor, and detects abnormality of the heating element in accordance with the temperature of the heating element detected by the temperature sensor, has been proposed (refer to Patent Document 1, for example).

PRIOR ART

Patent Document

[Patent Document 1] Japanese Patent Application Laid-Open Publication No. 2009-184639

DISCLOSURE OF THE INVENTION

Problems to be Solved by the Invention

However, the temperature of the heating element may also vary depending on the usage environment. Therefore, when the heating element is exposed to a low temperature environment, the temperature of the heating element becomes low even when the heating element is heating abnormally, and there is a possibility that the temperature measured by the temperature sensor is determined as normal.

The present invention has been made in light of the problems set forth above and has as its object to provide an abnormality determination apparatus for a vehicle that can determine an abnormality of a heating element without depending on the usage environment.

Means for Solving the Problems

To achieve the above object, inventors of the present invention have conducted extensive studies. Then, the inventors have found that although the temperature of the heating element varies depending on the outside air temperature (usage environment), a heat flux between the heating element and the outside air has been found not to vary depending on the outside air temperature. Note that the heat flux refers to an amount of heat passing through a unit area per unit time.

Therefore, in the invention disclosed in claim 1, there is provided a heat flux sensor having a thermoplastic resin made insulating substrate to which a plurality of first and second via holes penetrating in a thickness direction thereof are formed, first and second interlayer connection members composed of different metals from each other that are embedded in the first and the second via holes, the first and the second interlayer connection members being connected in series alternately, and a control unit that performs abnormality determination of a heating element disposed in a vehicle, and the following points are also featured.

That is, at least one of the metal forming the first and the second interlayer connection member is a solid-phase sintered alloy that is sintered in a state where a plurality of metal atoms maintaining a crystal structure of the metal atoms, the heat flux sensor is provided to the heating element and outputs a sensor signal corresponding to heat flux between the heating element and an outside air, and the control unit determines based on the sensor signal that there is abnormality in the heating element when the heat flux between the heating element and the outside air is out of a predetermined range.

According to this, since the abnormality determination of the heating element is performed based on the sensor signal outputted from the heat flux sensor, the abnormality determination of the heating element can be performed with high accuracy regardless of the usage environment.

MODE FOR CARRYING OUT THE INVENTION

Figure 1:
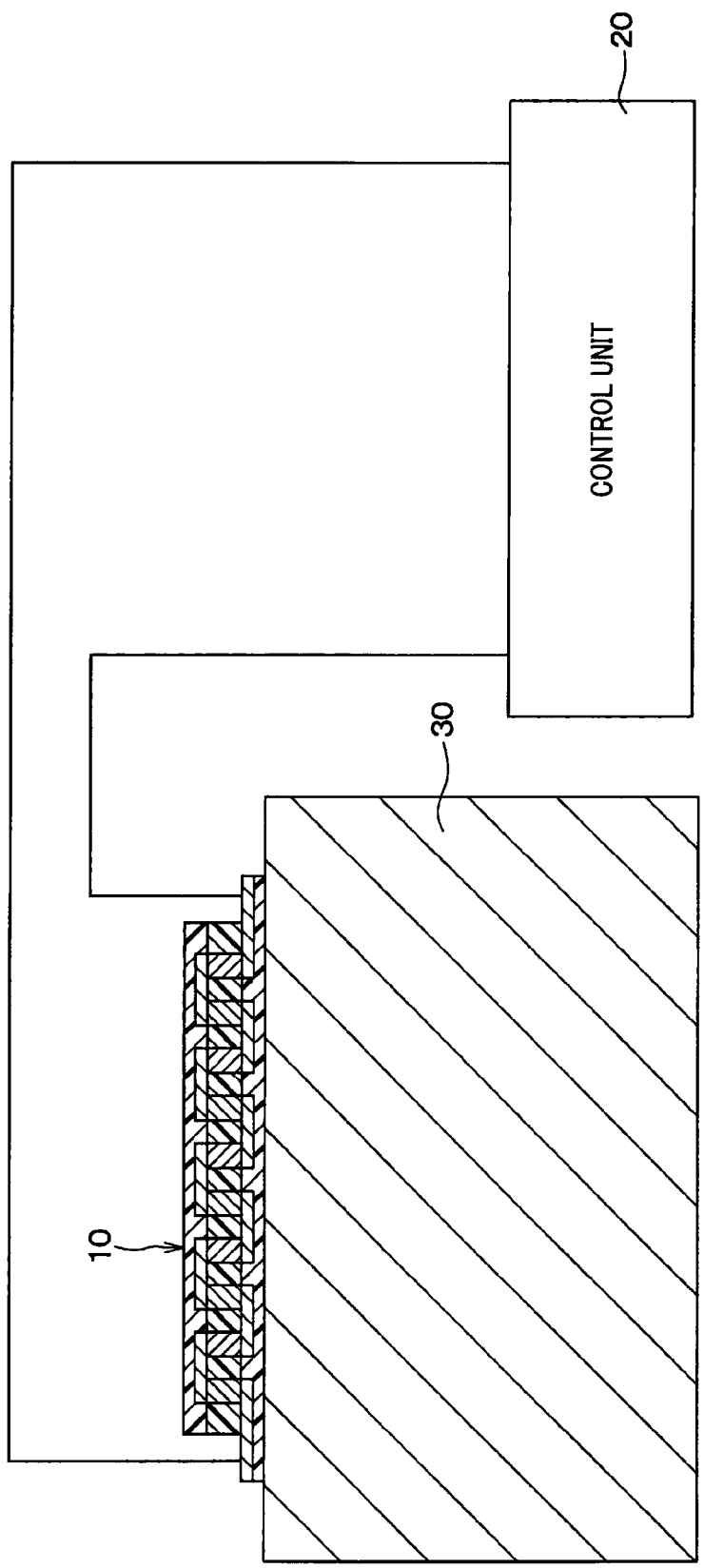
FIG. 1 shows a schematic diagram to which an abnormality determination apparatus for a vehicle according to a first embodiment of the present invention is applied.

Hereinafter, embodiments of the present invention will be described with reference to the drawings. Note that the same or equivalent parts will be denoted by the same reference numerals in the description in the following embodiments.

First Embodiment

A first embodiment of the present invention will be described. As shown in FIG. 1, an abnormality determination apparatus for a vehicle according to the present embodiment is provided with a heat flux sensor 10 and a control unit 20, and is used by the heat flux sensor being provided to a heating element 30 such as a battery or a vehicle engine control unit of a vehicle (vehicle ECU: Electronic Control Unit).

Figure 2:
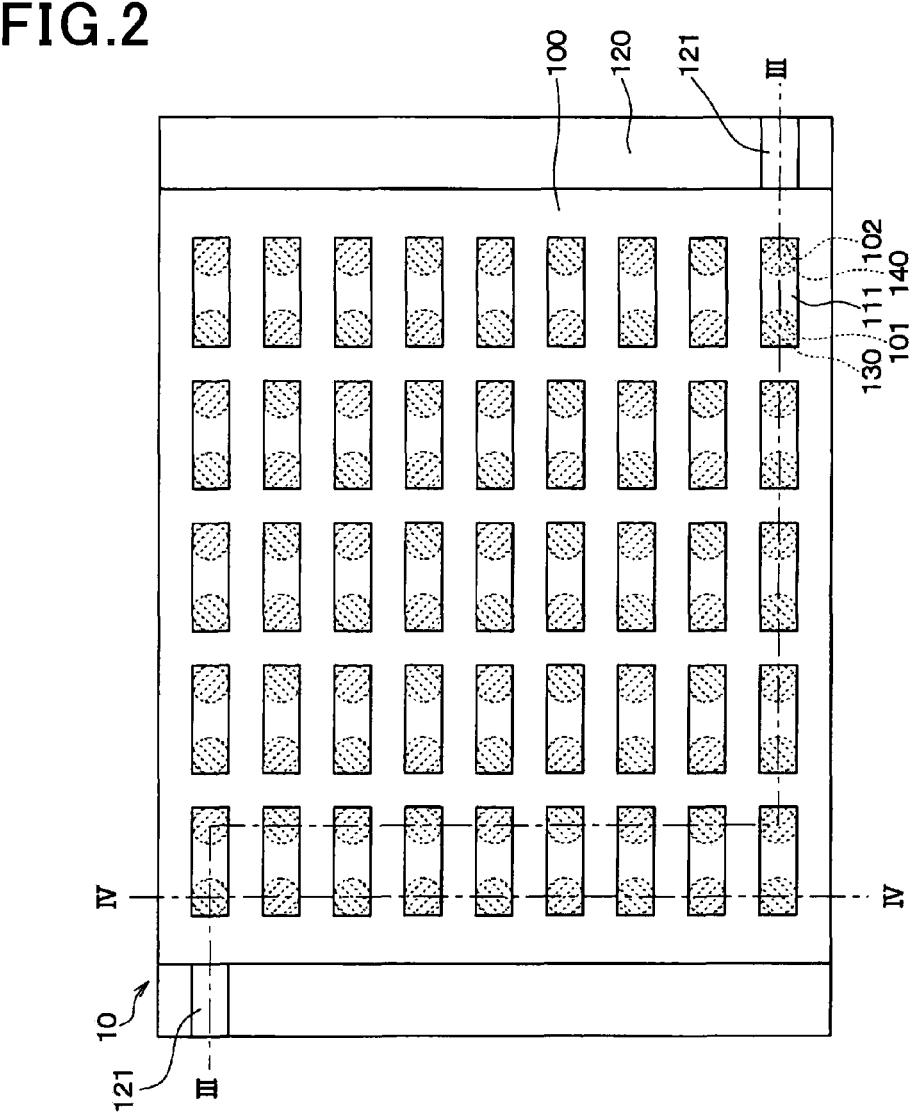
FIG. 2 shows a plan view of a heat flux sensor of FIG. 1.
Figure 3:
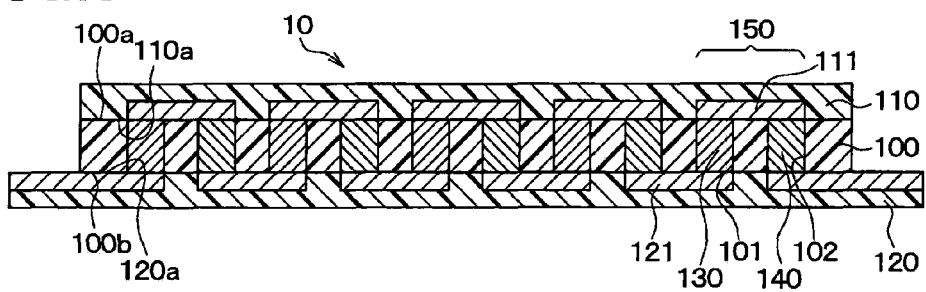
FIG. 3 is a sectional view taken along the line III-III in FIG. 2.
Figure 4:
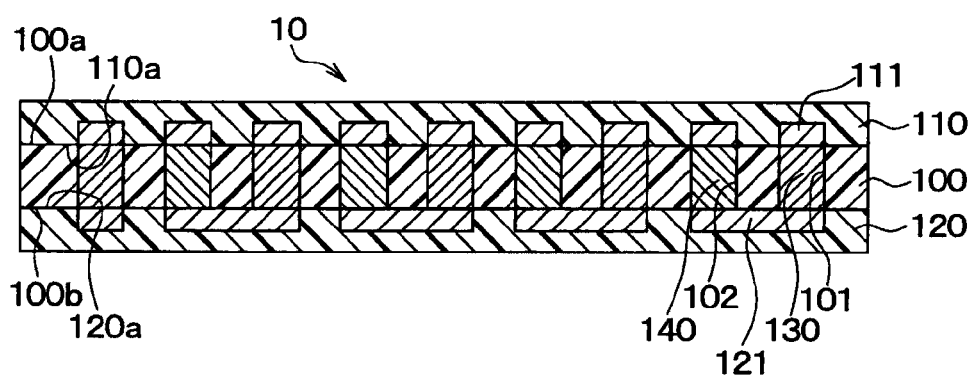
FIG. 4 is a sectional view taken along the line IV-IV in FIG. 2.

As shown in FIG. 2 to FIG. 4, the heat flux sensor 10 is formed by connecting first interlayer connecting members 130 and second interlayer connecting members 140 alternately in series inside an integrated unit of an insulating substrate 100, a front surface protective member 110, and a back surface protective member 120. Hereafter, a structure of the heat flux sensor 10 will be described specifically. Note that in order to facilitate understanding, the front surface protective member 110 is omitted in FIG. 2.

The insulating substrate 100 is composed of a rectangular-plane-shaped thermoplastic resin film typified by polyether ether ketone (PEEK), polyetherimide (PEI), and liquid crystal polymer (LCP) in the present embodiment. A plurality of first and second via holes 101, 102 penetrating in a thickness direction is formed in a zigzag pattern so as to be arranged alternately.

Note that although the first and the second via holes 101, 102 of the present embodiment are formed cylindrically with diameters toward a back surface 100b from a front surface 100a of the insulating substrate 100 that are constant, but may be formed in tapered shapes with diameters that decrease toward the back surface 100b from the front surface 100a of the insulating substrate 100. Further, they may be formed in tapered shapes with diameters that decrease toward the front surface 100a from the back surface 100b of the insulating substrate 100, or may be formed in rectangular tubes.

Then, the first interlayer connection members 130 are disposed in the first via holes 101, and the second interlayer connection members 140 are disposed in the second via holes 102. In other words, the first and the second interlayer connection members 130, 140 are arranged in the insulating substrate 100 so as to be alternated.

The first and the second interlayer connection members 130, 140 are composed of different metals from each other so as to show the Seebeck effect. For example, the first interlayer connection member 130 is composed of metal compounds (sintered alloy) that are solid-phase sintered so as to maintain a crystal structure of a plurality of metal atoms after sintering a powder of a P-type Bi—Sb—Te alloy. Further, the second interlayer connection member 140 is composed of metal compounds that are solid-phase sintered so as to maintain a crystal structure of a plurality of metal atoms after sintering a powder of an N-type Bi—Te alloy. Thus, by using the metal compounds that are solid-phase sintered so as to maintain a predetermined crystal structure as the first and the second interlayer connection members 130, 140, it is possible to increase electromotive force.

Note that although FIG. 2 is not a sectional view, the first and the second interlayer connection members 130, 140 are hatched in order to facilitate understanding.

The front surface protective member 110 composed of a rectangular-plane-shaped thermoplastic resin film typified by a polyether ether ketone (PEEK), polyetherimide (PEI), and liquid crystal polymer (LCP) is disposed on the front surface 100a of the insulating substrate 100. The surface protective member 110 has a plane shape of the same size as the insulating substrate 10, and is formed so that a plurality of front surface patterns 111 where a copper foil or the like is patterned on an one-surface 110a side facing the insulating substrate 100 are separated from each other. Then, the respective front surface pattern 111 is suitably electrically connected to the first and the second interlayer connection members 130, 140.

Specifically, as shown in FIG. 3, when a pair 150 is formed by one of the first interlayer connection members 130 and one of second interlayer connection members 140 that are adjacent to each other, the first and the second interlayer connection members 130, 140 of each pair 150 are connected to the same front surface pattern 111. That is, the first and the second interlayer connection members 130, 140 of each pair 150 are electrically connected via the front surface pattern 111. In the present embodiment, the pair 150 is formed by one of the first interlayer connection members 130 and one of second interlayer connection members 140 that are adjacent to each other along a longitudinal direction of the insulating substrate 100 (a left-right direction in FIG. 3).

The back surface protective member 120 composed of a rectangular-plane-shaped thermoplastic resin film typified by a polyether ether ketone (PEEK), polyetherimide (PEI) and liquid crystal polymer (LCP) is disposed on the back surface 100b of the insulating substrate 100. The back surface protective member 120 of which the length in the longitudinal direction of the insulating substrate 100 is configured longer than that of the insulation substrate 100, and is disposed on the back surface 100b of the insulating substrate 100 so that both end portions thereof in the longitudinal direction project from the insulating substrate 100.

Then, on the back surface protective member 120, a plurality of back surface patterns 121 to which copper foils or the like are patterned on an one-surface 120a side that face the insulating substrate 100 are formed so as to be separated from each other. Then, the respective back surface pattern 121 is suitably electrically connected to the first and the second interlayer connection members 130, 140.

Specifically, as shown in FIG. 3, in the pairs 150 adjacent in the longitudinal direction of the insulating substrate 100, the first interlayer connection member 130 of the one of the pairs 150 and the second interlayer connection member 140 of the another one of the pairs 150 are connected to the same back surface pattern 121. In other words, straddling the pairs 150, the first and the second interlayer connection members 130, 140 are electrically connected via the same back surface pattern 121.

Further, as shown in FIG. 4, the first and the second interlayer connection members 130, 140 adjacent along a direction perpendicular to the longitudinal direction (vertical direction in FIG. 2) at an outer edge of the insulating substrate 100 are connected to the same back surface pattern 121. In more detail, the adjoining first and second interlayer connection members 130, 140 are connected to the same rear surface pattern 121 so that those connected in series via the front surface pattern 111 and the back surface pattern 121 are folded over in the longitudinal direction of the insulating substrate 100.

Further, as shown in FIGS. 2 and 3, among the back surface patterns 121, portions of their ends are connected in series as described above and formed so as to be exposed from the insulating substrate 100. Then, the portions exposed from the insulating substrate 100 among the back surface patterns 121 become portions functioning as terminals connected to the control unit 20.

The above is the basic structure of the heat flux sensor 10 in the present embodiment. Then, this kind of heat flux sensor 10 outputs a sensor signal (electromotive voltage) corresponding to the heat flux passing through the heat flux sensor 10 in the thickness direction thereof to the control unit 20. When the heat flux changes, the electromotive voltage generated by the first and the second interlayer connection members 130, 140 connected in series alternately changes. Note that the thickness direction of the heat flux sensor 10 refers to a laminating direction of the insulating substrate 100, the front surface protective member 110, and the back surface protective member 120.

Now, a method for manufacturing the aforementioned heat flux sensor 10 will be described with reference to FIG. 5(*a*) to FIG. 5(*h*).

Figure 5:
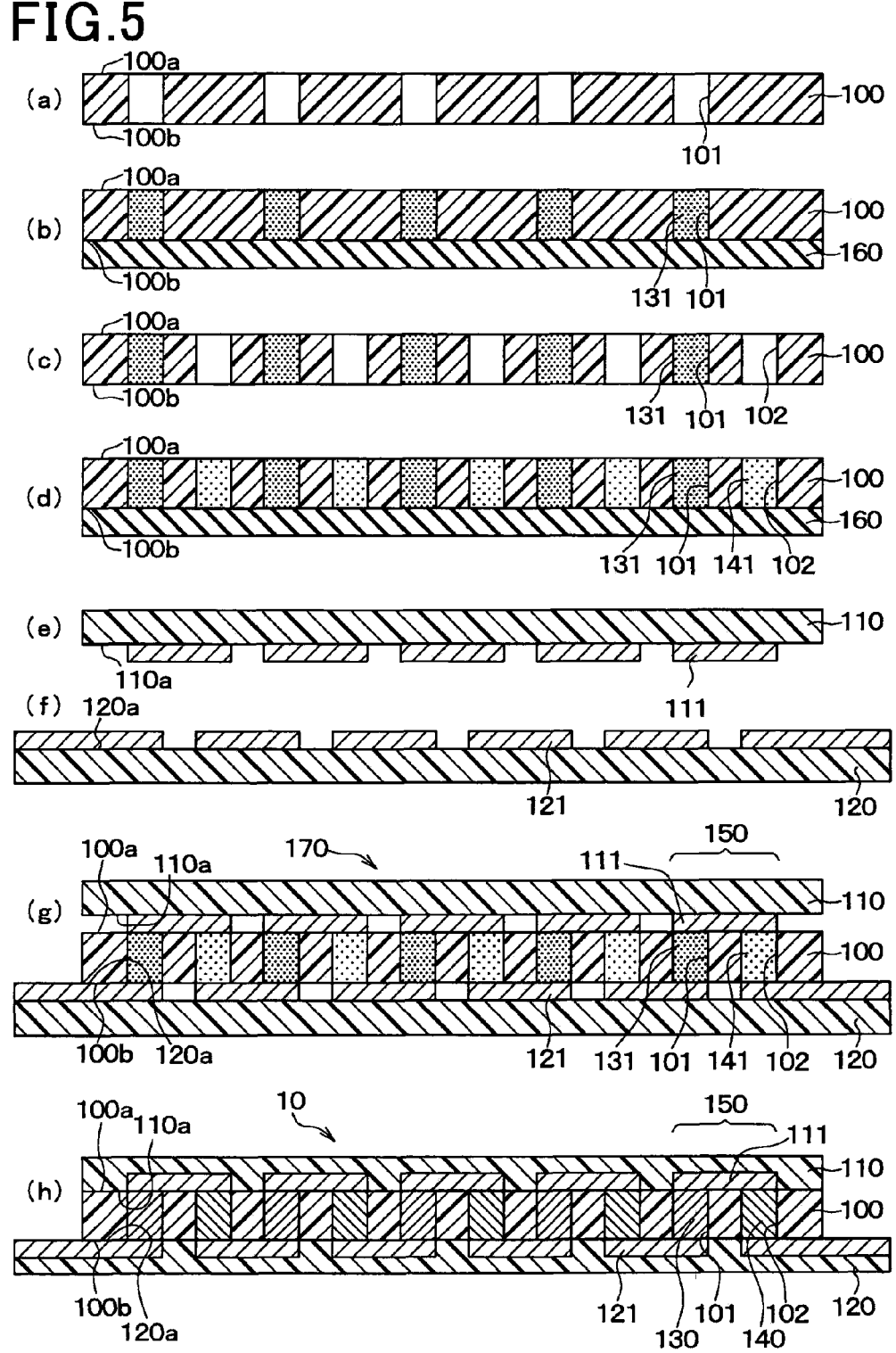
FIG. 5(a) to FIG. 5(h) show sectional views of manufacturing processes of the heat flux sensor.

First, as shown in FIG. 5(*a*), the insulating substrate 100 is provided, and a plurality of first via holes 101 are formed by a drill, laser, or the like.

Next, as shown in FIG. 5(*b*), the first via holes 101 are filled with first conductive pastes 131. Incidentally, it is preferable to employs a method (apparatus) described in Japanese Patent Application Laid-Open Publication No. 2011-187619, for example, as a method (apparatus) for filling the first conductive pastes 131 into the first via holes 101.

Briefly, the insulating substrate 100 is placed on a holding table, not shown, via an absorbent paper 160 so as the back surface 100*b* to face the absorbent paper 160. Then, while melting the first conductive pastes 131, the first via holes 101 are filled with the first conductive pastes 131. Thus, most of organic solvent in the first conductive pastes 131 is absorbed by the absorbent paper 160, and powders of the alloy are disposed closely in the first via holes 101.

Note that the absorbent paper 160 may be any of a material capable of absorbing the organic solvent of the first conductive pastes 131, and general wood free paper, or the like is used. Further, the powder of the Bi—Sb—Te alloy of which metal atoms maintain a predetermined crystal structure when being made into a paste by adding an organic solvent such as paraffin having a melting point of 43 degrees C. is used as the first conductive paste 131. Therefore, the filling of the first conductive paste 131 is performed in a state where the front surface 100*a* of the insulating substrate 100 is heated to about 43 degrees C.

Next, as shown in FIG. 5(*c*), a plurality of second via holes 102 are formed in the insulating substrate 100 by the drill, laser, or the like. As described above, the second via holes 102 are alternated with the first via holes 101, and are formed to constitute the zigzag pattern with the first via holes 101.

Next, as shown in FIG. 5(*d*), the second via holes 102 are filled with second conductive pastes 141. Note that this step can be carried out in the same step as the above-mentioned FIG. 5(*b*).

That is, once again, after the insulating substrate 100 is placed on the holding table, not shown, via the absorbent paper 160 so as the back surface 100*b* to face the absorbent paper 160, the second via holes 102 are filled with the second conductive pastes 141. Thus, most of organic solvent in the second conductive pastes 141 is absorbed by the absorbent paper 160, and powders of the alloy are disposed closely in the second via holes 102.

The powder of Bi—Te alloy of which metal atoms that are different from the metal atoms constituting the first conductive paste 131 maintain a predetermined crystal structure to be a paste by adding an organic solvent such as Terepine having a melting point of room temperature is used as the second conductive paste 141. That is, an organic solvent having a low melting point than that of the organic solvent constituting the first conductive paste 131 is used for the organic solvent constituting the second conductive paste 141. Then, the filling of the second conductive paste 141 is performed in a state where the front surface 100*a* of the insulating substrate 100 is maintained at room temperature. In other words, the filling of the second conductive paste 141 is performed in a state where the organic solvent contained in the first conductive paste 131 is solidified. Thereby, the second conductive pastes 141 are prevented from being mixed into the first via holes 101.

Note that the state where the organic solvent contained in the first conductive paste 131 is solidified refers to an organic solvent remaining in the first via holes 101 without being absorbed by the absorbent paper 160 in the step of FIG. 5(*b*).

Then, in a separate step from the above steps, as shown in FIG. 5(*e*) and FIG. 5(*f*), the copper foils or the like are formed on the one-surfaces 110*a*, 120*a* that face the insulating substrate 100 among the front surface protective member 110 and the back surface protective member 120. Then, by appropriately patterning the copper foils, the front surface protective member 110 to which the plurality of front surface patterns 111 that are separated from each other are formed, and the back surface protective member 120 to which the plurality of back surface patterns 121 that are separated from each other are formed are prepared.

Then, as shown in FIG. 5(*g*), a laminated body 170 is constituted by laminating the back surface protective member 120, the insulating substrate 100, and the front surface protective member 110 in this order.

In the present embodiment, the longitudinal length of the back surface protective member 120 is configured longer than that of the insulating substrate 100. Then, the back surface protective member 120 is disposed so as the both end portions thereof in the longitudinal direction project from the insulating substrate 100.

Then, as shown in FIG. 5(*h*), the laminated body 170 is integrated by placing the laminated body 170 between a pair of press plates (not shown), and applying pressure from both the upper and lower surfaces in the laminating direction while heating in a vacuum state. Specifically, the first and the second conductive pastes 131, 141 are solid-phase sintered to form the first and the second interlayer connection members 130, 140, and the laminated body 170 is integrated by applying pressure while heating the laminated body 170 so that the first and the second interlayer connection members 130, 140, the front surface patterns 111, and the back surface patterns 121 are connected.

Although not particularly limited, a buffer material such as rock wool paper may be disposed between the laminated body 170 and the press plate when integrating the laminated body 170. As described above, the above-mentioned heat flux sensor 10 is manufactured.

The control unit 20 is the vehicle ECU or the like composed by using a CPU, various memories constituting a memory means, peripheral devices, and the like, and is connected to the heat flux sensor 10, an audio means, a display means or the like (not shown). Then, it is determined whether a measured value measured by the heat flux sensor 10 is within a predetermined range, and when the measured value is out of the predetermined range, a warning that shows the abnormality of heating element 30 is informed to a driver through the audio means, the display means or the like.

When determining the measured value measured by the heat flux sensor 10, the sensor signal (electromotive voltage) outputted from the heat flux sensor 10 may be determined as it is, or a heat flux value obtained by converting the sensor signal to the heat flux value may be determined. Further, in the present embodiment, the vehicle ECU constituting the control unit 20 is a vehicle ECU that is a separate member from the heating element 30.

Figure 6:
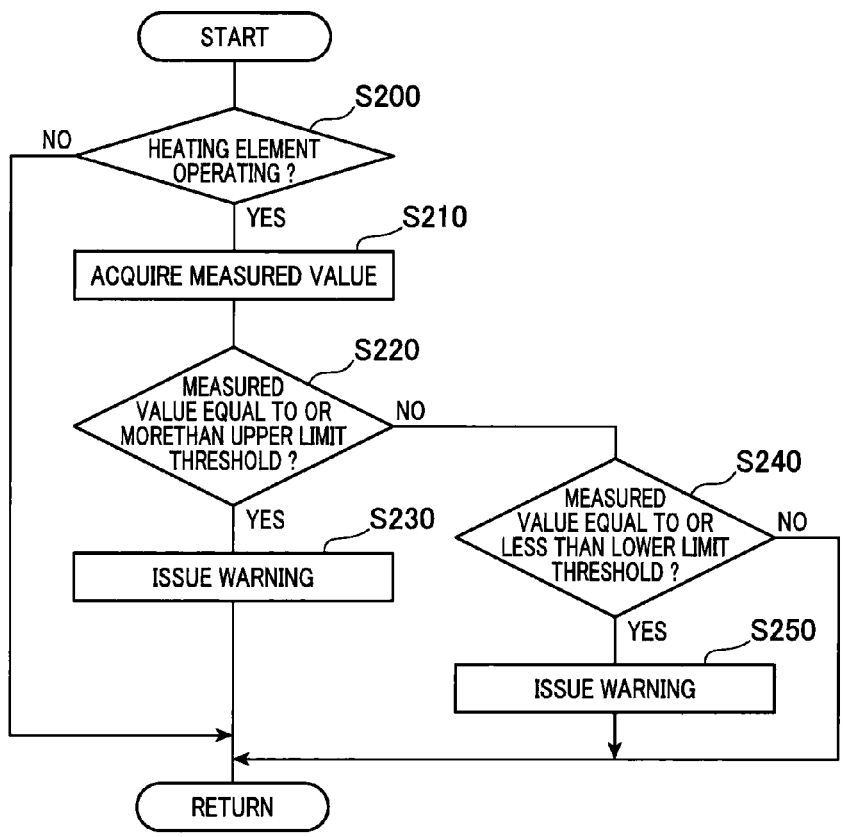
FIG. 6 shows a flow chart of an operation of a control unit.

The above is the configuration of the abnormality determination apparatus for the vehicle in the present embodiment. Next, an operation of the control unit 20 in such an abnormality determination apparatus for a vehicle will be described with reference to FIGS. 6 and 7. As shown in FIG. 1, the abnormality determination apparatus for the vehicle according to the present embodiment is used by attaching the heat flux sensor 10 to the heating element 30.

Note that the control unit 20 performs the following processes for each predetermined period when an ignition switch is turned on in the vehicle, for example. In addition, the heating element 30 is constituted by the vehicle ECU, as described above, and the heat is generated from the CPU that constitutes the vehicle ECU, various memories constituting the memory means, peripheral devices, or the like. Then, although the temperature of the heating element 30 will vary depending on the outside air temperature (the usage environment), the heat flux between the heating element 30 and the outside air will not be changed by the outside air temperature. Therefore, when the heating element 30 generates heat to become a predetermined temperature, the heat flux between the heating element 30 and the outside air becomes constant regardless of the outside air temperature.

First, it is determined whether or not the heating element 30 to which the heat flux sensor 10 is attached is operating (S200). Since the heating element 30 is the vehicle ECU in the present embodiment, the determination in step S200 whether the vehicle ECU is in operation is determined by performing transmission and reception of signals.

Then, when the heating element 30 is not in operation (S200: NO), it returns to the start of the process (Return). In contrast, when the heating element 30 is in operation (S200: YES), the measured value measured by the heat flux sensor 10 is acquired (S210). Specifically, since the sensor signal (measured value) corresponding to the heat flux between the heating element 30 and the outside air is outputted from the heat flux sensor 10, this sensor signal (measured value) is acquired.

Then, it is determined whether the acquired measured value is equal to or more than an upper limit threshold (S220), and when the measured value is equal to or more than the upper limit threshold (S220: YES) as in a state 4 in FIG. 7, a warning is issued (S230). Note that the acquired measured value becomes equal to or more than the upper limit threshold in an occasion, for example, where a respective component of the vehicle ECU that is the heating element 30 is not operating properly for reasons such as being damaged, working excessively, or the like, and abnormal heat generation in the heating element 30 is occurring.

Further, when the acquired measured value is smaller than the upper limit threshold value (S220: NO), it is determined whether the measured value is equal to or less than a lower limit threshold (S240). Then, as in a state 2 in FIG. 7, when the measured value is equal to or less than the lower limit threshold value (S240: YES), similarly to the process in step S230, the warning is issued (S250). Note that the acquired measured value becomes equal to or less than the lower limit threshold in an occasion, for example, when heat radiation is obstructed from the heating element 30 or the heat flux sensor 10 by being covered with foreign matter such as soot.

Figure 7:
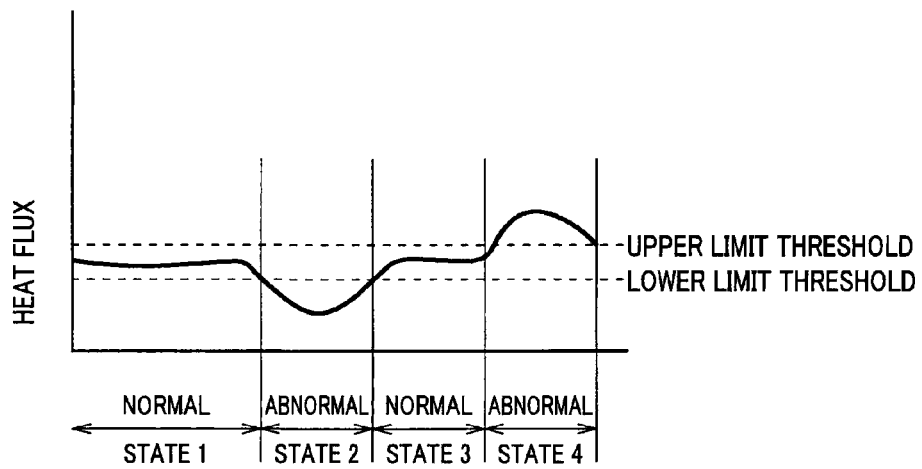
FIG. 7 shows a diagram of a relation between a condition of the heat flux and a heating element.

On the other hand, as shown in a state 1 and a state 3 in FIG. 7, when the measured value is smaller than the upper limit threshold value and more than the lower limit threshold value (S240: NO), the heat flux between the heating element 30 and the outside air is normal, thus it returns to the start of the process (Return).

Note that the determination of the measured values in the processes of step S220 and step S240 may determine the sensor signal (electromotive voltage) outputted from the heat flux sensor 10 directly, as described above, or the sensor signal may be converted to the heat flux and determine this heat flux. Further, in the present embodiment, the warning in the processes of step S230 and step S250 is adapted to inform the driver by driving the audio means, the display means or the like that the heating element 30 is not in the normal condition. For example, it is informed to the driver using an electronic sound by driving the audio means. In addition, it is informed to the driver by displaying an indication of an occurrence of abnormality on a liquid crystal display disposed on a portion of an instrumental panel disposed in front of a stirring wheel or in a dashboard by driving the display means.

As described above, in the present embodiment, the heat flux between the heating element 30 and the outside air is detected by the heat flux sensor 10, and the abnormality determination of the heating element 30 is performed based on the sensor signal outputted from the heat flux sensor 10. Therefore, regardless of the usage environment, the abnormality determination of the heating element 30 can be performed with high accuracy.

Further, in the present embodiment, the heat flux sensor 10 is composed by forming the first and the second via holes 101, 102 in the insulating substrate 100 made of a thermoplastic resin, and by disposing the first and the second interlayer connection members 130, 140 in the first and the second via holes 101, 102. Therefore, the density of the first and the second interlayer connection members 130, 140 can be increased by appropriately changing the number, the diameter, the intervals or the like of the first and the second via holes 101, 102. Thereby, it becomes possible to increase the electromotive force, and the sensitivity of the heat flux sensor 10 can be increased.

Furthermore, the metal compounds (Bi—Sb—Te alloy, Bi—Te alloy) that are solid-phase sintered so as to maintain their original crystal structure after sintering are used as the first and the second interlayer connection members 130, 140 in the heat flux sensor 10 of the present embodiment. That is, the metal that forms the first and the second interlayer connection members 130, 140 is the sintered alloy that is sintered in a state where the plurality of metal atoms maintaining the crystal structure of the metal atoms. Thereby, as compared with a case where a metal that forms the first and the second interlayer connection members 130, 140 is a sintered alloy that is liquid-phase sintered, it becomes possible to increase the electromotive force, and the sensitivity of the heat flux sensor 10 can be increase.

The insulating substrate 100, the front surface protective member 110, and the back surface protective member 120 of the heat flux sensor 10 in the present embodiment are constituted by using thermoplastic resin, and they have flexibility. Therefore, it is possible to deform the heat flux sensor 10 appropriately in accordance with a portion to be disposed. That is, even if a heating element 30 is a spherical, for example, the heat flux sensor 10 can be disposed along the heating element 30.

Other Embodiments

The present invention is not limited to the embodiments described above and can be appropriately modified within the scope described in the claims.

For example, a temperature sensor for detecting the surface temperature of the heating element 30 may be provided in the first embodiment.

Figure 8:
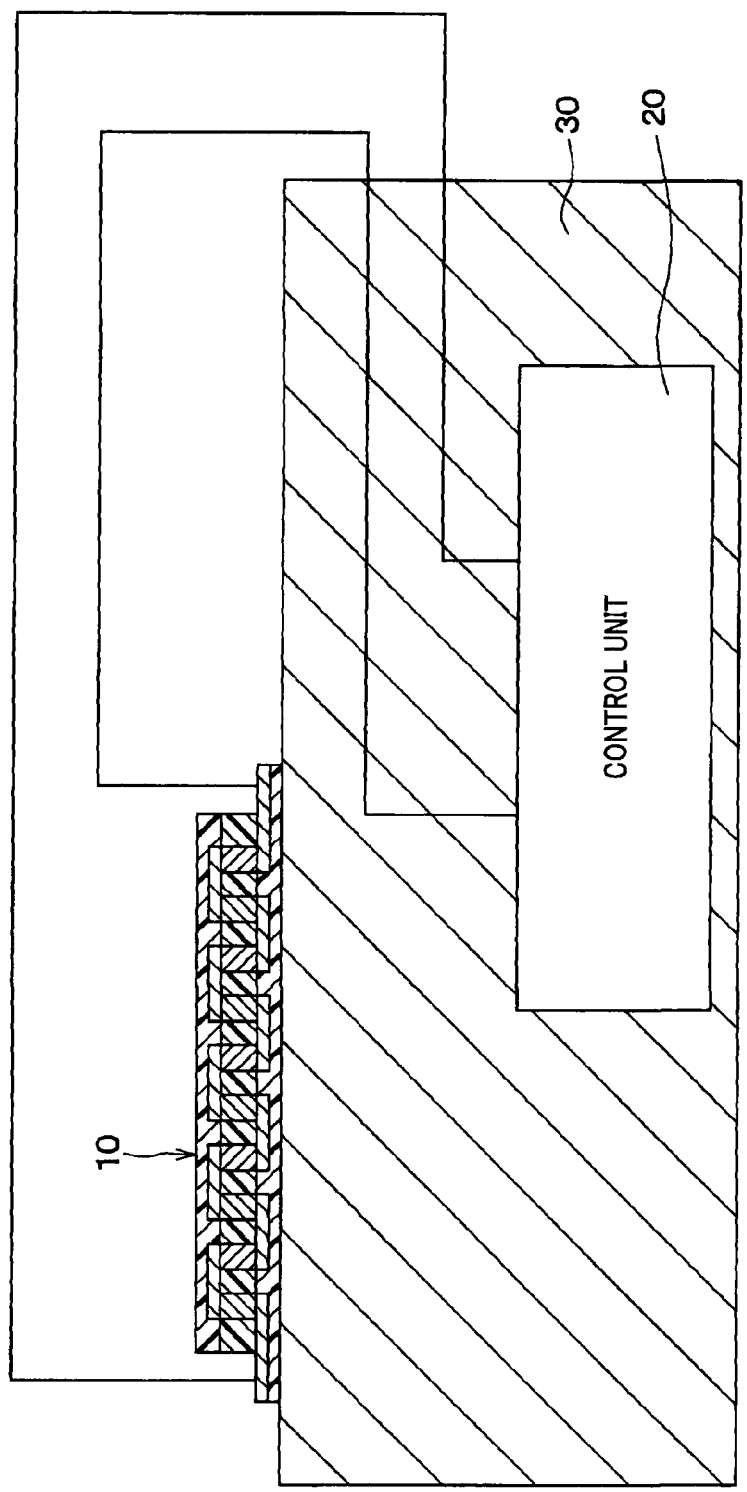
FIG. 8 shows a schematic diagram to which an abnormality determination apparatus for a vehicle according to another embodiment of the present invention is applied.

In the first embodiment mentioned above, both the control unit 20 and the heating element 30 are composed of the vehicle ECU. Therefore, as shown in FIG. 8, it is also possible to allow the vehicle ECU that is the heating element 30 to perform the processing of the control unit 20. That is, the control unit 20 and the heating element 30 may be the same vehicle ECU.

Reference Example 1

As described above, the heat flux between the object (heating element 30) and the outside air does not depend on the outside air temperature (the usage environment). Therefore, although the abnormality determination apparatus for the vehicle has been described in the first embodiment, it is also possible to apply the heat flux sensor 10 and the control unit 20 of the present invention to other devices.

That is, the present reference example regards to a fire alarm characterized in that the heat flux sensor is provided on a wall surface of a room and outputs a sensor signal corresponding to a heat flux between the wall surface and air in the room, and the control unit determines based on the sensor signal that a fire has occurred in the room when the heat flux between the air in the room and the wall surface is above a predetermined threshold.

Figure 9:
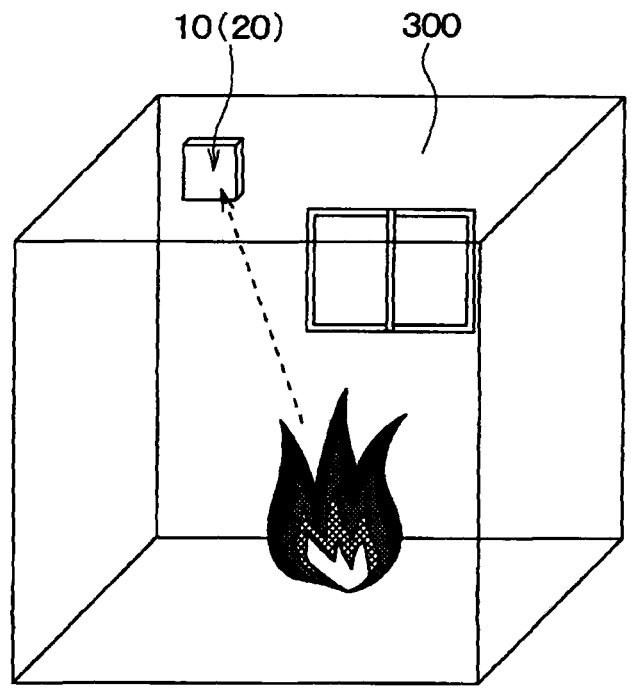
FIG. 9 shows a schematic view of a first reference example of the abnormality determination apparatus of the present invention applied to a fire alarm.

Specifically, as in the first embodiment, and as shown in FIGS. 2 to 4, the insulating substrate 100, the front surface protective member 110, and the back surface protective member 120 are integrated, and this integrated component in which the first and the second interlayer connection members 130, 140 are connected in series alternately is used as the heat flux sensor 10. As in the first embodiment, the control unit 20 is composed by using the CPU, various memories constituting the storage means, peripheral devices, and the like, and is connected to the audio means, a lighting means or the like (not shown). Then, the heat flux sensor 10 and the control unit 20 of the present reference example are disposed on the wall surface 300 of the room, as shown in FIG. 9. Note that although one integrally packaging the heat flux sensor 10 and the control unit 20 is shown in the present reference example, the heat flux sensor 10 and the control unit 20 may be separated.

Figure 10:
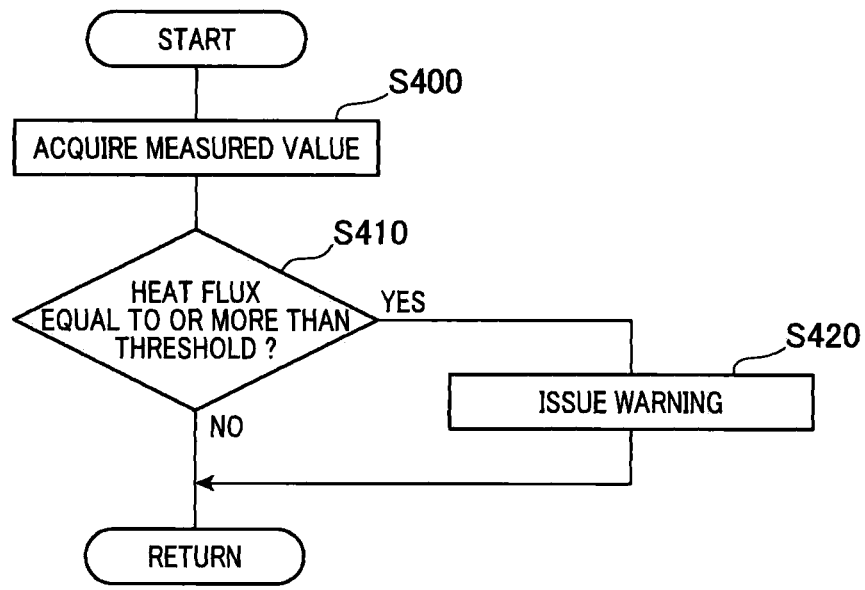
FIG. 10 shows a flowchart of an operation of a control unit in the first reference example.

Next, an operation of the control unit 20 in the present reference example will be described with reference to FIG. 10. Note that the operation of the control unit 20 will be started when a switch (not shown) is turned on by a resident, for example, and performs the following processes for each predetermined period.

First, a measured value measured by the heat flux sensor 10 is acquired (S400). Specifically, since the sensor signal (measured value) corresponding to the heat flux between the wall 300 and the air in the room is outputted from the heat flux sensor 10, this sensor signal (measured value) is acquired.

Then, it is determined whether the measured value of the heat flux sensor 10 is equal to or more than a threshold value (S410). Then, when the measured value is equal to or more than the threshold value (S410: YES), a fire is occurring and thus a warning is issued (S420).

Note that the warning in the process of step S420 is configured to notify the residents that the fire is occurring by driving the audio means, the display means or the like. For example, it is informed to the residents using the electronic sound by driving the audio means. In addition, it is also informed to the residents by lighting a warning lamp or the like by driving the lighting means.

Further, when the measured value is less than the threshold (S410: NO), since a fire has not occurred in the room, and it returns to the start of the process (Return).

Note that the determination of the measured values in the processes of step S410 may determine the sensor signal (electromotive voltage) outputted from the heat flux sensor 10 directly, similarly to the first embodiment, or the sensor signal may be converted to the heat flux and determine this heat flux.

Thus, the present invention can also be applied to a fire alarm. When the present invention is applied to the fire alarm, regardless of the outside air temperature, it is possible to perform the detection of a fire with a high accuracy.

Reference Examples 2 and 3

In the present reference examples, examples of applying the heat flux sensor 10 and the control unit 20 of the present invention to a human body abnormality determination device will be described.

That is, the present reference examples regard to the human body abnormality determination device that the heat flux sensor is installed on a human body and outputs a sensor signal corresponding to the heat flux between the body and the outside air, and the control unit determines based on the sensor signal that there is abnormality in the human body when the heat flux between the human body and the outside air is out of the predetermined range.

Specifically, as in the first embodiment, and as shown in FIGS. 2 to 4, the insulating substrate 100, the front surface protective member 110, and the back surface protective member 120 are integrated, and this integrated component in which the first and the second interlayer connection members 130, 140 are connected in series alternately is used as the heat flux sensor 10. As in the first embodiment, the control unit 20 is composed by using the CPU, various memories constituting the storage means, peripheral devices, and the like, and is connected to the audio means, a display means or the like (not shown).

Figure 11A:
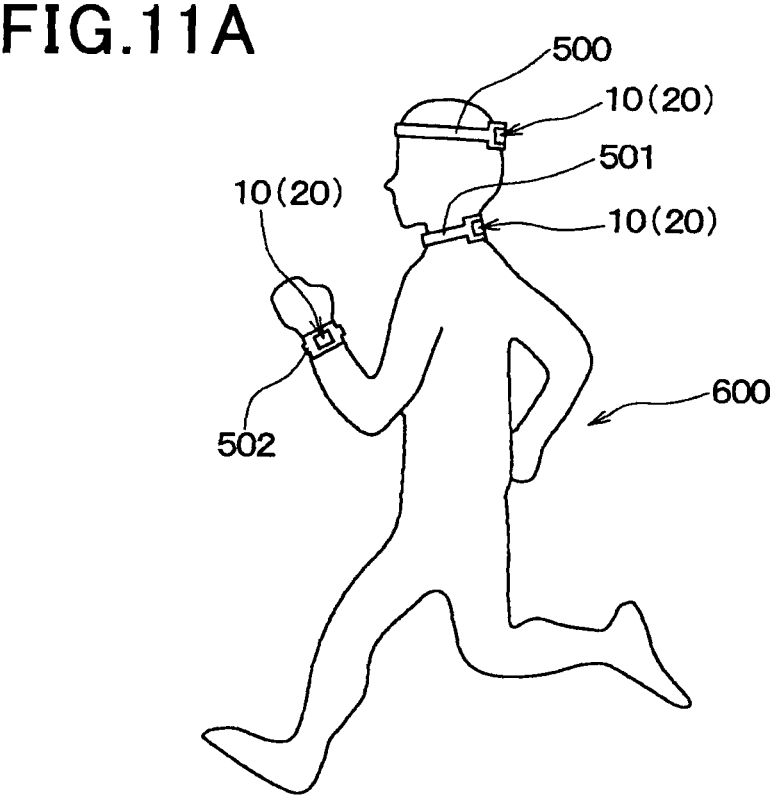
FIG. 11A shows a schematic view of a second reference example of the abnormality determination apparatus of the present invention applied to an abnormality determination apparatus for a human body.
Figure 11B:
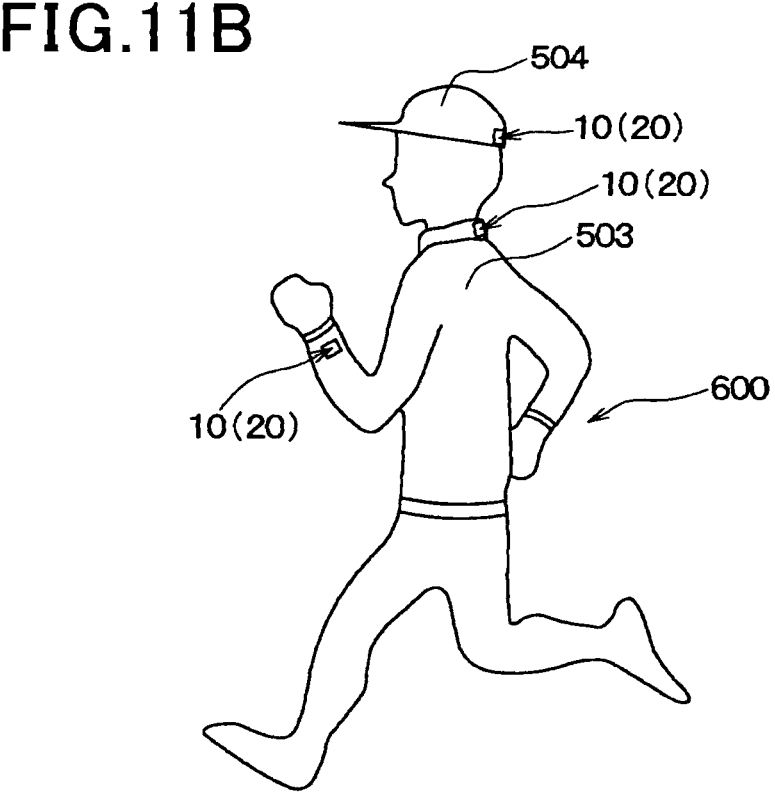
FIG. 11B shows a schematic view of a third reference example of the abnormality determination apparatus of the present invention applied to an abnormality determination apparatus for a human body.

Then, as shown in FIG. 11A which is a reference example 2, the heat flux sensors 10 and the control units 20 of the present reference examples are equipped in a hair-band 500, a neck-warmer 501, or a wrist-band 502, and are installed to the human body 600 by the human body 600 wearing them. In addition, as shown in FIG. 11B which is a reference example 3, the heat flux sensors 10 and the control units 20 are equipped in a jacket 503 or a hat 504, and are installed to the human body 600 by the human body 600 wearing them.

Note that although one integrally packaging the heat flux sensor 10 and the control unit 20 is shown in the present reference example, the heat flux sensor 10 and the control unit 20 may be separated. Further, in FIGS. 11A and 11B, positions where the heat flux sensors 10 and the control units 20 are equipped can be appropriately changed.

Figure 12:
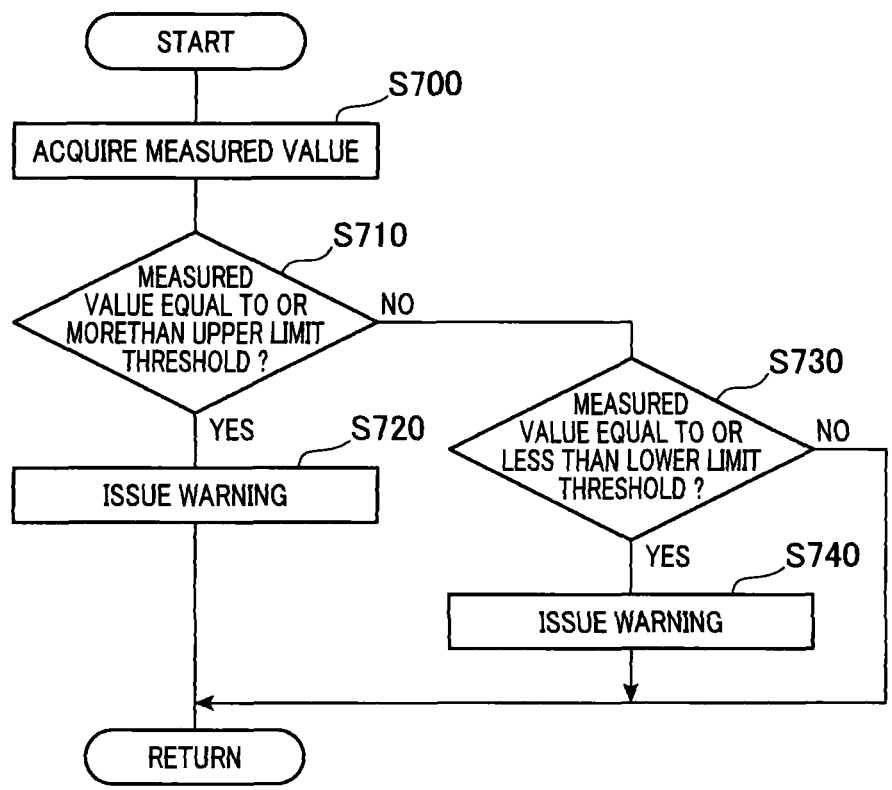
FIG. 12 shows a flowchart of an operation of a control unit in the second and third reference examples.

Next, an operation of the control unit 20 in the present reference example will be described with reference to FIG. 12. Note that the operation of the control unit 20 will be started when a switch (not shown) is turned on by a user, for example, and performs the following processes for each predetermined period.

First, a measured value measured by the heat flux sensor 10 is acquired (S700). Specifically, since the sensor signal (measured value) corresponding to the heat flux between the human body 600 and the outside air is outputted from the heat flux sensor 10, this sensor signal (measured value) is acquired.

Then, similarly to the process of S210, it is determined whether the acquired measured value is equal to or more than an upper limit threshold (S710), and when the measured value is equal to or more than the upper limit threshold value (S710: YES), a warning is issued (S720). Note that the acquired measured value becomes equal to or more than the upper limit threshold in an occasion, for example, when the human body 600 is overworked during jogging or the like.

Further, when the acquired measured value is smaller than the upper limit threshold value (S710: NO), it is determined whether the measured value is equal to or less than a lower limit threshold (S730). Then, when the measured value is equal to or less than the lower limit threshold value (S730: YES), similarly to the process in step S720, the warning is issued (S740). Note that the acquired measured value becomes equal to or less than the lower limit threshold in an occasion, for example, when the heat from the human body 600 is not radiated properly, and there is a possibility of heat stroke.

On the other hand, when the measured value is smaller than the upper limit threshold value and more than the lower limit threshold value (S730: NO), the human body 600 is normal, thus it returns to the start of the process (Return).

Note that the determination of the measured values in the processes of step S710 and step S730 may determine the sensor signal (electromotive voltage) outputted from the heat flux sensor 10 directly, as in the first embodiment, or the sensor signal may be converted to the heat flux and determine this heat flux. Further, in the present embodiment, the warning in the processes of step S720 and step S740 is adapted to inform the user by driving the audio means, the display means or the like that the user own (human body 600) is in the abnormal condition. For example, it is informed to the user using an electronic sound by driving the audio means. In addition, it is informed to the user by displaying that abnormality is occurring on the liquid crystal display by driving the display means.

Thus, the present invention can also be applied to a human body abnormality determination device. When the present invention is applied to the human body abnormality determination device, regardless of the outside air temperature, it is possible to perform human body abnormality determination with a high accuracy.

REFERENCE SIGNS LIST 10 heat flux sensor
20 control unit
30 heating element
100 insulating substrate
101, 102 first, second via holes
130, 140 first, second interlayer connection members

What is claimed is:

1. An abnormality determination apparatus for a vehicle comprising:
   a heat flux sensor having a thermoplastic resin made insulating substrate to which a plurality of first and second via holes penetrating in a thickness direction thereof are formed, first and second interlayer connection members composed of different metals from each other that are embedded in the first and the second via holes, the first and the second interlayer connection members being connected in series alternately; and
   a control unit that performs abnormality determination of a heating element disposed in a vehicle; wherein,
   at least one of the metal forming the first and the second interlayer connection member is a sintered alloy that is solid-phase sintered in a state where a plurality of metal atoms maintaining a crystal structure of the metal atoms;
   the heat flux sensor is provided to the heating element and outputs a sensor signal corresponding to heat flux between the heating element and an outside air; and
   the control unit determines based on the sensor signal that there is abnormality in the heating element when the heat flux between the heating element and the outside air is out of a predetermined range.

2. The abnormality determination apparatus for the vehicle according to claim 1, wherein,
   the heat flux sensor includes a front surface protective member to which front surface patterns are formed disposed on a front surface of the insulating substrate and a back surface protective member to which back surface patterns are formed disposed on a back surface that is an opposite side of the front surface, and the back surface protective member, the insulating substrate, and the front surface protective member are integrated.

3. The abnormality determination apparatus for the vehicle according to claim 1, wherein,
   the heating element is a vehicle ECU.

* * * * *